United States Patent [19]
Tanimoto

[11] 3,846,647
[45] Nov. 5, 1974

[54] TRIGGER CIRCUIT FOR USE WITH MULTIVIBRATORS

[76] Inventor: Kenji Tanimoto, 3-5, Akasaka 3-chome Minatoku, Tokyo, Japan

[22] Filed: Dec. 20, 1972

[21] Appl. No.: 316,752

[30] Foreign Application Priority Data
Dec. 23, 1971 Japan .............................. 46-104091

[52] U.S. Cl. .................... 307/273, 328/20, 328/127, 307/236
[51] Int. Cl. .......................................... H03k 3/284
[58] Field of Search .................... 307/273, 292, 236; 328/207, 20, 127

[56] References Cited
UNITED STATES PATENTS

| | | | |
|---|---|---|---|
| 3,183,368 | 5/1965 | Ross | 307/273 |
| 3,349,255 | 10/1967 | McAvoy | 307/273 |
| 3,391,389 | 7/1968 | Cruger | 307/273 |
| 3,443,118 | 5/1969 | Rogers | 307/273 |
| 3,483,479 | 12/1969 | Harshbarger | 307/273 |
| 3,571,732 | 3/1971 | Richardson | 307/273 |
| 3,643,159 | 2/1972 | Seki | 307/273 |
| 3,705,991 | 12/1972 | Hobo | 307/273 |
| 3,727,082 | 4/1973 | Codina | 307/273 |

*Primary Examiner*—John S. Heyman
*Attorney, Agent, or Firm*—J. T. Martin; Gerald J. Ferguson, Jr.; Joseph J. Baker

[57] ABSTRACT

A monostable multivibrator including trigger circuitry therefor comprising monostable multivibrator means having a normally conducting control element and a normally non-conducting control element, trigger means including means responsive to the positive-going transitions in an input signal for controlling at least one of said control elements to switch the monostable multivibrator means to its unstable state for a predetermined length of time; and the trigger means including means responsive to the negative-going transitions in the input signal for controlling the other of the control elements to again switch the monostable multivibrator to its unstable state for the predetermined length of time; whereby the circuitry may multiply the frequency of the input signal at the output of the monostable multivibrator means.

4 Claims, 3 Drawing Figures

TRIGGER CIRCUIT FOR USE WITH MULTIVIBRATORS

CROSS REFERENCES TO RELATED APPLICATIONS

This application is related to copending application, entitled "Frequency Multiplying Circuit," and filed herewith by the inventor of the subject application. The above copending application is hereby incorporated herein by reference.

BACKGROUND OF THE INVENTION

1. Field of the Invention

The invention relates to triggering circuitry for multivibrators and in particular to such circuitry using triggering pulses of alternating polarities for one-shot multivibrators.

2. Description of the Prior Art

FIG. 1 is an illustrative block diagram of a conventional multivibrator including the triggering circuitry therefor. Input pulse train $f_o$ is applied to a differentiator circuit *a* which generates spikes of alternating polarities. These are applied to a phase inverter circuit *b* which produces the triggering pulses for a one-shot multivibrator *c* all with the same polarity. The output pulse train from the multivibrator has double the frequency of the input pulse train.

SUMMARY OF THE INVENTION

An object of the invention is to provide triggering pulses of alternating polarity which can directly be applied from a differentiator to trigger one-shot multivibrators.

It is a further object of this invention to provide a simple and stable triggering circuit for multivibrators through the elimination of phase inverter circuitry and the like.

Other objects and advantages of this invention will become apparent upon reading the appended claims in conjunction with the following detailed description and the attached drawing.

DESCRIPTION OF THE PREFERRED EMBODIMENT

Figure 1:
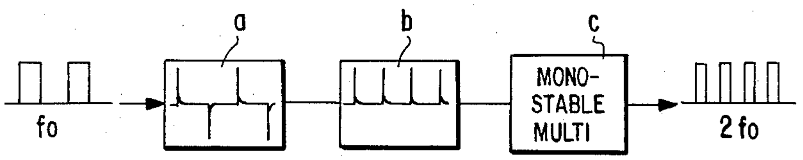
FIG. 1 (PRIOR ART)
FIG. 1 is an illustrative block diagram of conventional circuits.
Figure 2:
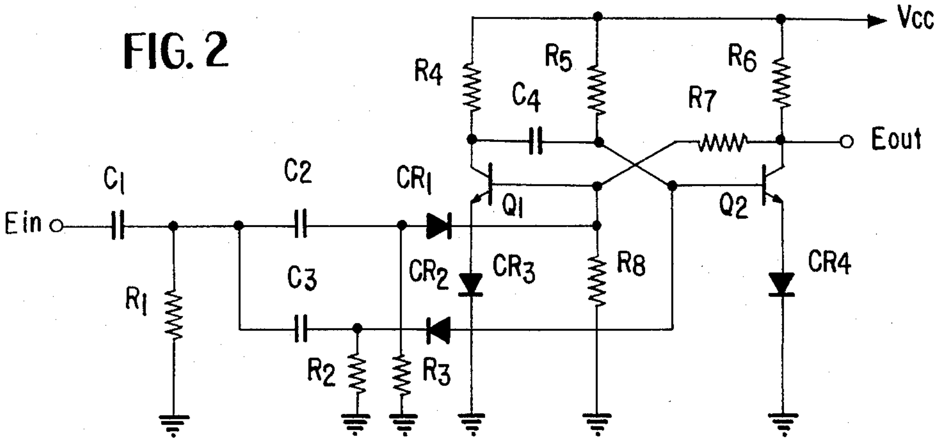
FIG. 2 is an illustrative schematic diagram of triggering circuit and multivibrator in accordance with the invention.
Figure 3:
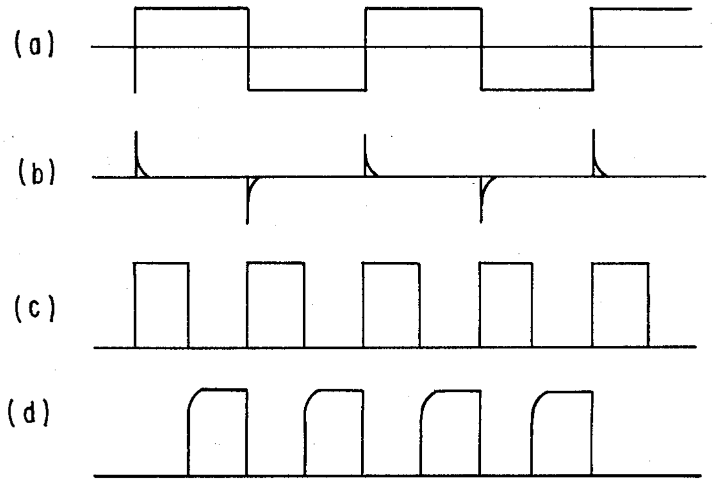
FIG. 3 illustrates waveforms occurring in the FIG. 2 embodiment.

The invention is now described in detail by way of the embodiment of FIG. 2. When the input terminal $E_{in}$ is not energized, one of the semiconductor devices $Q_1$ remains cutoff, while the other device $Q_2$ remains conductive. The pulse train of FIG. 3*a* is applied to the input terminal $E_{in}$ and differentiated by capacitor $C_1$ and resistor $R_1$ to generate the triggering spikes of alternating polarities shown in FIG. 3*b*.

The instant the positive spike reaches the base of $Q_1$ through the capacitor $C_2$ and the forward biased diode $CR_1$, the device $Q_1$ is turned on to its conductive state, thereby causing the collector voltage of $Q_1$ to decrease fron an initial positive value, thus, reducing the voltage coupled to the base of $Q_2$ to cut off $Q_2$. FIG. 3*c* shows the change in the collector voltage of $Q_2$, where the pulse width is determined by the physical values of the discharging circuit elements, $C_4$ and $R_5$. After the time lapse corresponding to the pulse width, $Q_2$ returns to its original conductive state.

The negative spike is coupled through the capacitor $C_3$ and the forward biased diode $CR_2$ to the base of $Q_2$, and sets $Q_2$ from the conductive to the cutoff state, consequently causing the collector voltage of $Q_2$ to rise in the positive direction. Due to the collector voltage of $Q_2$ being connected to the base of $Q_1$ through the feed-back resistor $R_7$, the collector voltage of $Q_1$ decreases as shown in FIG. 3*d*, with the resultant change in the state of $Q_2$ from conductive to cutoff state. As stated above, $Q_2$ returns to the stable state of conduction after the time lapse equal to the time constant determined by $C_4$ and $R_5$.

From the foregoing, it can be seen that by using the exemplary circuit of FIG. 2, a pulse train having a frequency twice that of the input pulse train is available at the output terminal $E_{out}$.

Numerous modifications of the invention will become apparent to one of ordinary skill in the art upon reading the foregoing disclosure. During such a reading, it will be evident that this invention provides unique multivibrator and trigger circuit therefor for accomplishing the objects and advantages hereinstated.

What is claimed is:

1. A monostable multivibrator including trigger circuit therefor comprising:

a single monostable multivibrator means having a normally conducting transistor with a collector, emitter, and base and a normally non-conducting transistor with a collector, emitter, and base;

trigger means including means responsive to the positive-going transitions in an input pulse signal for triggering said normally non-conducting transistor on to thereby switch said monostable multivibrator means to its unstable state for a predetermined length of time which is set to be always shorter in duration than said input signal; and said trigger means including means responsive to the negative-going transitions in said input pulse signal for triggering said normally conducting transistor off to thereby again switch said monostable multivibrator to its unstable state for said predetermined length of time, said input signal being a pulse train and said trigger means including means for differentiating said input pulse train so that positive spikes are produced for each positive-going transition in the pulse train and applied to said one transistor and negative spikes are produced for the negative-going transitions and applied to said other transistor, said trigger means further including a first diode having one pole connected to said differentiating means and its other pole directly connected to the base of said normally non-conducting transistor and a second diode having one pole connected to said differentiating means and its other pole directly connected to the base of said normally conducting transistor, both said diodes being connected to their respective transistors at the same time.

2. A multivibrator as in claim 1 wherein said positive spikes are applied to the normally non-conducting transistor to turn it on and said negative spikes are applied to said normally conducting transistor to turn it off.

3. A multivibrator as in claim 1 where said control elements are NPN transistors and the negative pole of said first diode is directly connected to the base of said normally non-conducting transistor and the positive pole of said second diode is directly connected to the base of said normally conducting transistor.

4. A multivibrator as in claim 3 where said monostable multivibrator means includes a capacitor connected between the collector of the normally non-conducting transistor and the base of the normally conducting transistor and a resistor connected between the bias voltage supplied for said multivibrator and the base of said normally conducting transistor whereby said capacitor discharges through said resistor to establish said predetermined time whenever either said normally conducting transistor is turned off or said normally non-conducting transistor is turned on.

* * * * *